United States Patent
Okuyama et al.

(10) Patent No.: US 10,988,277 B2
(45) Date of Patent: Apr. 27, 2021

(54) SYNTHETIC RESIN CONTAINER AND PREFORM

(71) Applicant: YOSHINO KOGYOSHO CO., LTD., Tokyo (JP)

(72) Inventors: Yuichi Okuyama, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 40 days.

(21) Appl. No.: 16/395,529

(22) Filed: Apr. 26, 2019

(65) Prior Publication Data
US 2019/0367203 A1   Dec. 5, 2019

(30) Foreign Application Priority Data

May 31, 2018 (JP) .............................. JP2018-105002

(51) Int. Cl.
*B65D 1/02* (2006.01)
*B29C 49/00* (2006.01)
(Continued)

(52) U.S. Cl.
CPC ........ *B65D 1/0246* (2013.01); *B29C 49/0005* (2013.01); *B65D 1/0207* (2013.01); *B65D 23/102* (2013.01); *B65D 2501/0009* (2013.01); *C08L 23/06* (2013.01); *C08L 23/12* (2013.01); *C08L 67/02* (2013.01); *C08L 2203/10* (2013.01)

(58) Field of Classification Search
CPC .. B65D 1/0246; B65D 23/102; B65D 1/0207; B65D 2501/0009; B65D 1/023; B65D 39/08; B65D 41/04; B65D 41/0457; B65D 41/0464; B65D 41/08; B65D 41/34; B65D 41/38; B65D 47/122; B29C 49/0005; B29C 49/4205; B29C 49/06; C08L 23/06; C08L 23/12; C08L 67/02; C08L 2203/10;
(Continued)

(56) References Cited

U.S. PATENT DOCUMENTS 3,875,725 A * 4/1975 Carmichael ............... B65B 7/28
53/485
4,451,426 A * 5/1984 Branchadell ........ B29C 49/0073
264/535
(Continued)

FOREIGN PATENT DOCUMENTS

JP        2015-137135 A      7/2015

*Primary Examiner* — Kareen K Thomas
(74) *Attorney, Agent, or Firm* — Oliff PLC (57) ABSTRACT

A synthetic resin container and a preform that can suppress increase in size of a mouth and can improve stability when a mouth is transferred by being gripped by a gripper. A synthetic resin container includes a tubular mouth and forms an accommodation space for contents. An outer circumferential surface of the mouth is provided with a gripper engaging groove to be engaged with a gripper of a transfer apparatus, the gripper engaging groove is formed such that a width of the groove of an opening opened in the outer circumferential surface of the mouth is decreased from an opening toward a bottom of the groove, and the gripper engaging groove corresponds to a shape of the gripper and has an upper side inclination and a lower side inclination respectively obliquely extending with respect to a plane perpendicular to an axis of the mouth.

8 Claims, 5 Drawing Sheets

(51) Int. Cl.
  *B65D 23/10* (2006.01)
  *C08L 23/06* (2006.01)
  *C08L 23/12* (2006.01)
  *C08L 67/02* (2006.01)

(58) Field of Classification Search
  CPC . B29B 2911/14331; B29B 2911/14335; B29B 2911/1442
  See application file for complete search history.

(56) References Cited

U.S. PATENT DOCUMENTS

| | | | | |
|---|---|---|---|---|
| 4,545,496 | A * | 10/1985 | Wilde | B65D 41/0435 215/252 |
| 4,939,890 | A * | 7/1990 | Peronek | B67B 3/2033 53/289 |
| 5,054,267 | A * | 10/1991 | Dundas | B29C 49/4817 53/477 |
| 5,704,240 | A * | 1/1998 | Jordan | B21D 15/04 72/103 |
| 5,888,598 | A * | 3/1999 | Brewster | B29C 49/0005 264/513 |
| 6,298,638 | B1 * | 10/2001 | Bettle | B65B 3/022 53/284.5 |
| 6,619,016 | B1 * | 9/2003 | Sindermann | B67C 3/222 53/426 |
| 6,698,160 | B2 * | 3/2004 | Peronek | B65B 7/2835 53/317 |
| 8,241,718 | B2 * | 8/2012 | Witz | B29C 45/2711 428/35.7 |
| 2002/0148800 | A1 * | 10/2002 | Ozawa | B65D 1/0246 215/40 |
| 2007/0158294 | A1 * | 7/2007 | Tanaka | B65D 1/0246 215/43 |
| 2008/0317989 | A1 * | 12/2008 | Abe | B65D 23/02 428/36.9 |
| 2009/0077933 | A1 * | 3/2009 | Backhaus | B65G 47/846 53/561 |
| 2009/0099541 | A1 * | 4/2009 | Qin | A61F 13/53 604/376 |
| 2009/0211329 | A1 * | 8/2009 | Hanafusa | B65D 1/0246 72/379.4 |
| 2010/0006532 | A1 * | 1/2010 | Lee | B65D 53/04 215/349 |
| 2010/0061831 | A1 * | 3/2010 | Nishino | A61L 2/087 414/225.01 |
| 2012/0034063 | A1 * | 2/2012 | Fahldieck | B67C 3/242 414/816 |
| 2014/0377400 | A1 * | 12/2014 | Schuster | B29C 49/48 425/522 |
| 2018/0257264 | A1 * | 9/2018 | Kawamura | B29B 11/14 |

* cited by examiner

SYNTHETIC RESIN CONTAINER AND PREFORM

TECHNICAL FIELD

The present disclosure relates to a synthetic resin container that contains contents and a preform that forms a synthetic resin container by blow molding.

BACKGROUND

Synthetic resin containers formed by synthetic resin materials such as polyethylene (PE), polypropylene (PP), polyethylene terephthalate (PET) and the like have been commonly used as containers that contains contents such as beverages and detergents and toiletries such as shampoo, hand soap and the like (see, for example, Patent Literature 1 (PTL 1)).

Such a container includes, for example, a tubular mouth, a tubular trunk continuous under the mouth and a bottom closing a lower end portion of the trunk, and forms an accommodation space that contains contents therein. The container can be formed, for example, by blow molding using a bottomed cylindrical preform formed by injection molding or by extrusion molding using a tubular molten parison extruded by an extruder. It is to be noted that, when a container is formed by using a preform, a mouth of the preform is not stretched and deformed during blow molding, and thus the mouth of the container after molding and the mouth of the preform have a common shape.

CITATION LIST

Patent Literature

PTL 1: JP2015-137135A

SUMMARY

Technical Problem

When a container or a preform is transferred during a process such as molding of a container and filling of contents, a container or a preform is transferred with its mouth gripped and held from its both sides by a gripper (chuck) of a transfer apparatus.

Figure 6:
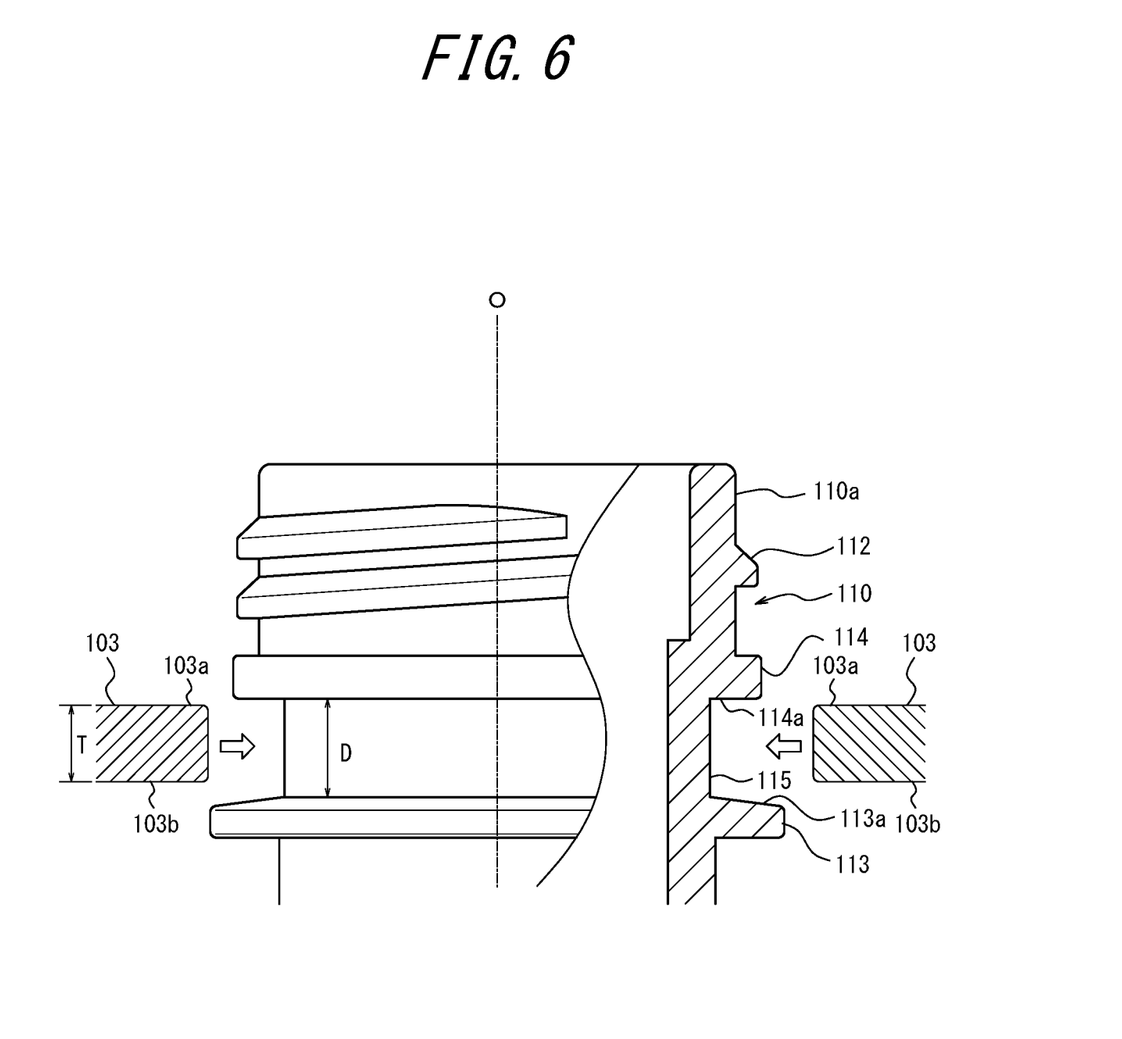
FIG. 6 is an elevation view illustrating, in cross section, a part of a mouth of a synthetic resin container or a preform as a reference.

FIG. 6 is an example of a mouth 110 of a synthetic resin container or a preform. An outer circumferential surface 110a of the mouth 110 is provided with an external thread 112 configured to attach a cap and the like and a neck ring 113 to be supported by an upper surface of a blow molding mold. Further, between the external thread 112 and the neck ring 113 is provided with a bead ring 114 configured to increase stability during transfer by being supported by an upper surface 103a of a gripper 103. Between the bead ring 114 and the neck ring 113 is provided with a straight portion 115 with an outline approximately parallel to an axis O in a longitudinal sectional view passing through the axis O of the mouth 110.

When such a mouth 110 is gripped by the gripper 103, as illustrated in FIG. 6, the gripper 103 is inserted toward the straight portion 115 between the bead ring 114 and the neck ring 113, and the straight portion 115 is gripped by the gripper 103 from both sides while the lower surface 114a of the bead ring 114 being in contact with the upper surface 103a of the gripper 103.

However, in the above described example, providing the bead ring 114 increases not only a resin amount used for the mouth 110 but also the axial size of the mouth 110 by a thickness of the bead ring 114. Further, in order to move the gripper 103 smoothly toward the straight portion 115, the axial distance D between the bead ring 114 and the neck ring 113 should be larger than the thickness T of the gripper 103, which further increases the axial thickness of the mouth 110.

Further, even if the upper surface 103a of the gripper 103 is brought into contact with the lower surface 114a of the bead ring 114 when the mouth 110 is gripped by the gripper 103, a clearance is formed between the lower surface 103b of the gripper 103 and the upper surface 113a of the neck ring 113. Thus there is room for improvement in view of stability during transfer.

It would therefore be helpful to provide a synthetic resin container and a preform having a configuration that can suppress increase in size of the mouth and improve stability when the mouth is transferred by being gripped by a gripper.

Solution to Problem

The present disclosure has been conceived in view of the above described problems. The disclosed synthetic resin container is a synthetic resin container that includes a tubular mouth and forms an accommodation space for contents, in which an outer circumferential surface of the mouth is provided with a gripper engaging groove to be engaged with a gripper of a transfer apparatus;

the gripper engaging groove is formed such that a width of the groove is decreased from an opening opened in the outer circumferential surface of the mouth toward a bottom of the groove; and the gripper engaging groove corresponds to a shape of the gripper and has an upper side inclination and a lower side inclination respectively obliquely extending with respect to a plane perpendicular to an axis of the mouth.

It is to be noted that, in the disclosed synthetic resin container, the outer circumferential surface of the mouth may preferably be provided with a cap engaging portion located above the gripper engaging groove and a mold engaging portion located below the gripper engaging groove.

Further, in the disclosed synthetic resin container, with the gripper engaging groove engaged with the gripper, the upper side inclination and the lower side inclination may preferably be respectively disposed facing a first inclination and a second inclination provided on the gripper.

Further, in the disclosed synthetic resin container, in the longitudinal sectional view passing through the axis of the mouth, inclination angles of the upper side inclination and the lower side inclination with respect to a plane perpendicular to the axis of the mouth may preferably be in a range of not less than 15° and not more than 60°, respectively.

Further, the disclosed preform is a synthetic resin preform that includes a tubular mouth and is molded into a container of a predetermined shape by blow molding, in which an outer circumferential surface of the mouth is provided with a gripper engaging groove to be engaged with a gripper of a transfer apparatus;

the gripper engaging groove is formed such that a width of the groove is decreased from an opening opened in the outer circumferential surface of the mouth toward a bottom of the groove; and the gripper engaging groove corresponds to a shape of the gripper and has an upper side inclination and a lower side inclination respectively extending with respect to a plane perpendicular to the axis of the mouth.

It is to be noted that, in the disclosed preform, the outer circumferential surface of the mouth may preferably be provided with a cap engaging portion located above the gripper engaging groove and a mold engaging portion located below the gripper engaging groove.

In the disclosed preform, with the gripper engaging groove engaged with the gripper, the upper side inclination and the lower side inclination may preferably be respectively disposed facing a first inclination and a second inclination provided on the gripper.

In the disclosed preform, in the longitudinal sectional view passing through the axis of the mouth, inclination angles of the upper side inclination and the lower side inclination with respect to a plane perpendicular to the axis of the mouth may preferably be in a range of not less than 15° and not more than 60°, respectively.

Advantageous Effect

According to the present disclosure, a synthetic resin container and a preform having a configuration that can suppress increase in size of the mouth and improve stability when a mouth is transferred by being gripped by a gripper can be provided.

DETAILED DESCRIPTION

The present disclosure will be illustrated in greater detail below with reference to the drawings. It is to be noted that, in this specification, the "above" is a side where a mouth is located with respect to a trunk (up side in FIG. 1) and the "below" is a side where the trunk is located with respect to the mouth (down side in FIG. 1) in an erected state in which an axis O of a synthetic resin container 1 is disposed such that it extends in a vertical direction, as illustrated in FIG. 1.

The synthetic resin container 1 (hereinafter referred to merely as "container 1") according to an embodiment of the present disclosure illustrated in FIG. 1 includes a tubular mouth 10 and a trunk continuous to the mouth 10, and forms an accommodation space for contents S. The trunk may be formed into, but not be limited to, a shape that includes a shoulder continuous to the lower end portion of the mouth 10 and extending radially outward in a downward direction, a tubular trunk body continuous to an outer circumferential edge of the shoulder, and a bottom configured to close a lower end portion of the trunk body. Further, the mouth 10 may be, but not be limited to, a cylindrical shape.

Although the container 1 can be formed by biaxial stretch blow molding by using a preform 2 described below or extrusion blow molding by using a tubular molten parison extruded from an extruder, for example, no specific limitation is placed on a manufacturing method of the container 1. Further, no specific limitation is placed on the pressurized fluid used during blow molding, and it may be a gas such as air or a liquid. Further, the container 1 is made of a synthetic resin material such as polyethylene (PE), polypropylene (PP), polyethylene terephthalate (PET) and the like, and can contain therein shampoo or hand soap as contents. No specific limitation is placed on the kinds of materials forming the container 1, and further, no specific limitation is placed on the kinds of contents.

Figure 1:
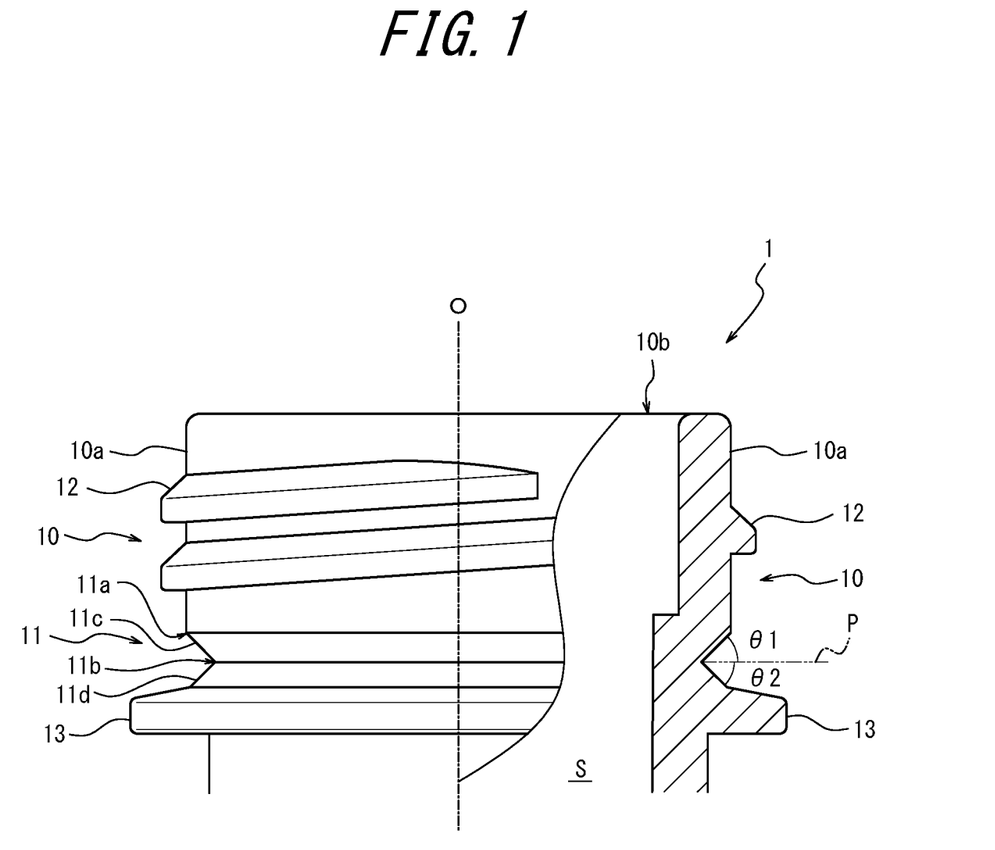
FIG. 1 is an elevation view illustrating, in cross section, a part of a mouth of a synthetic resin container according to an embodiment of this disclosure.
Figure 2:
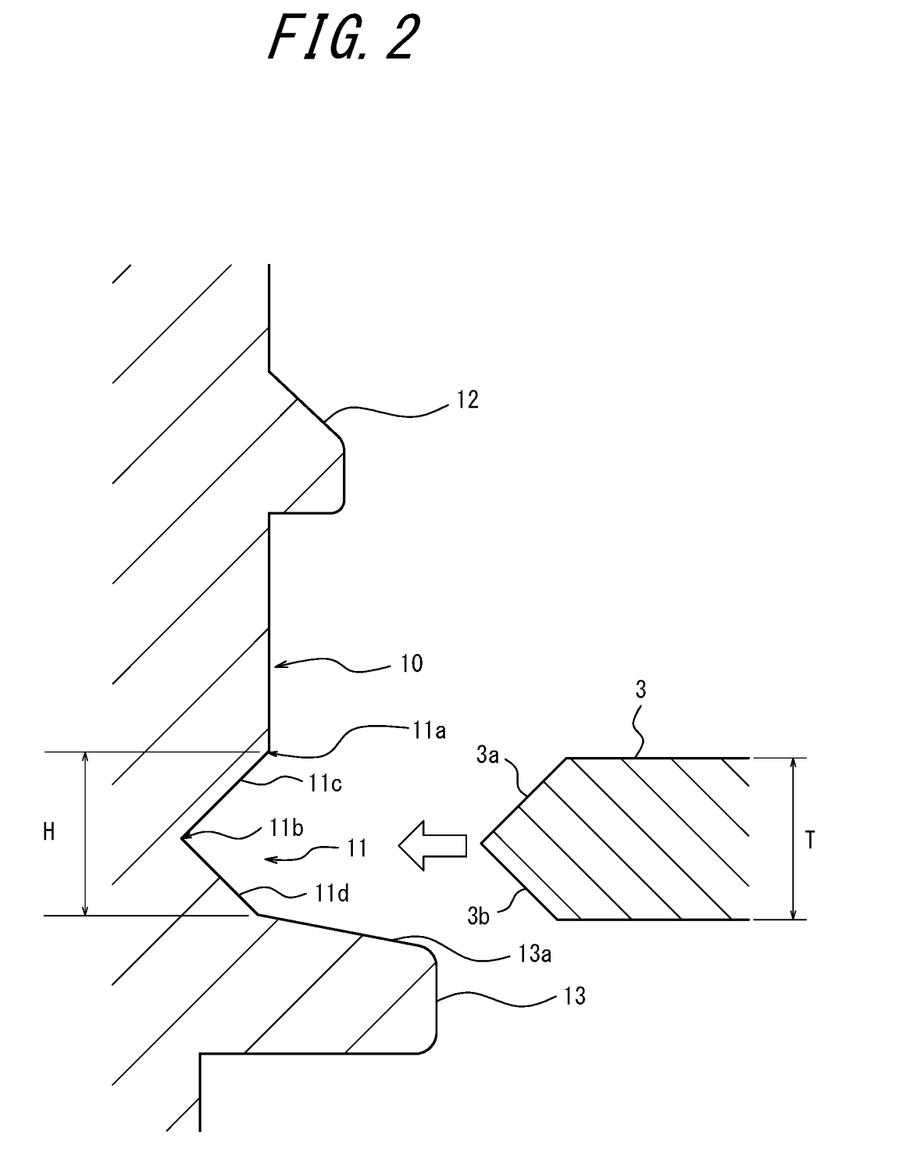
FIG. 2 is a partially enlarged view of the synthetic resin container in FIG. 1.

As illustrated in FIGS. 1 and 2, an outer circumferential surface 10a of the mouth 10 is provided with a gripper engaging groove 11 to be engaged with a gripper 3 of a transfer apparatus configured to transfer the container 1. The gripper engaging groove 11 is formed such that a width of the groove (a width of the groove in an axis direction parallel to the axis O) thereof is gradually decreased from an opening 11a opened in the outer circumferential surface 10a of the mouth 10 toward a bottom of the groove 11b located on the radially innermost side. It is to be noted that, in this example, the width of the groove H in the opening 11a of the gripper engaging groove 11 is configured such that it equals to the thickness T of the gripper 3, but not limited thereto.

Further, the gripper engaging groove 11 has an upper side inclination 11c and a lower side inclination 11d configured to correspond to a shape of the gripper 3 and respectively obliquely extend with respect to a plane P perpendicular to the axis O of the mouth 10 (see FIG. 2). In a longitudinal sectional view passing through the axis O of the mouth 10, the upper side inclination 11c and the lower side inclination 11d of the gripper engaging groove 11 of this example extend in a linear state and the outline of the gripper engaging groove 11 is V-shaped.

It is to be noted that the gripper engaging groove 11 may preferably be an annular groove extending over the outer circumferential surface 10a of the mouth 10 in the circumferential direction. However, it may be formed into an intermittent annular shape provided partially in the circumferential direction as far as it is formed at least in a circumferential direction area to be engaged with the gripper 3. It is to be noted that, when the gripper engaging groove 11 is formed into an annular shape, a circumferential alignment is not required when the mouth 10 is gripped by the gripper 3.

The outer circumferential surface 10a of the mouth 10 is provided with an external thread 12 located above the gripper engaging groove 11. The external thread 12 serves as a cap engaging portion, and a cap and the like with an inner circumferential surface provided with an internal thread corresponding to the external thread 12 can be attached thereto. It is to be noted that a cap connecting portion is not limited to the external thread 12, and may be changed appropriately. For example, as a cap connecting portion, the outer circumferential surface 10a of the mouth 10 may be provided with a protrusion or a recess to allow a recess or a protrusion provided on the cap inner circumferential surface to be engaged from below. In other words, the mouth 10 may be configured such that a plug type cap can be attached thereto. It is to be noted that plugging means that, when a cap is pushed to the mouth 10 in the axis direction from underneath, an engaging portion provided on the cap side climbs over the engaging portion provided on the mouth 10 and engages therewith (undercut engagement), and as a result the cap is engaged with and held by the mouth 10.

Not only a cap configured to merely close an upper end opening 10b of the mouth 10 but also a cap having a discharge structure of contents may be attached to the mouth 10. Examples of such cap include, for example, a topped tubular discharge cap with a top wall provided with a discharge port (hole) configured to discharge contents contained in the accommodation space S, a push-down pump type discharge tool in which a pump mechanism is actuated by a push-down operation of a nozzle head and thus the contents in the accommodation space S can be pumped and discharged, or a trigger type discharge tool in which a pump mechanism is actuated by a pulling operation of an operation lever and thus the contents in the accommodation space S can be pumped and discharged.

The outer circumferential surface 10a of the mouth 10 is provided with a neck ring 13 as a mold engaging portion located below the gripper engaging groove 11. The neck ring 13 may preferably be an annular protrusion extending over the entire outer circumferential surface 10a of the mouth 10 in the circumferential direction. However, it may be an intermittent annular protrusion provided partially in the circumferential direction. The lower surface of the neck ring 13 is flat, and when the preform 2 is attached to a mold for blow molding, the lower surface of the neck ring 13 is supported by the upper surface of the mold, for example.

When the container 1 is transferred by a transfer apparatus, the mouth 10 is gripped by the gripper 3 of the transfer apparatus from both right and left sides and is held. In this case, a pair of grippers 3 is moved in the direction perpendicular to the axis O (horizontal direction) from the radially outside to the inside of the mouth 10, inserted into the gripper engaging groove 11 and engaged therewith. With the gripper 3 engaged with the gripper engaging groove 11, the upper side inclination 11c and the lower side inclination 11d of the gripper engaging groove 11 are respectively disposed facing a first inclination 3a and a second inclination 3b provided on the inner end of the gripper 3. Further, the upper side inclination 11c contacts the first inclination 3a and the lower side inclination 11d contacts the second inclination 3b, and as a result the mouth 10 is positioned with respect to the gripper 3. Therefore positional displacement and inclination of the mouth 10 with respect to the gripper 3 is suppressed, and as a result the container 1 held by the gripper 3 can be transferred in a stable state.

In this manner, the gripper engaging groove 11 is provided with the upper side inclination 11c and the lower side inclination 11d that correspond to the shape of the gripper 3. Thus stability when the mouth 10 is gripped by the gripper 3 is improved, and possibility of inclination and displacement of the container 1 during transfer process can be reduced.

Further, the container 1 according to this embodiment does not need to be provided with a configuration of the bead ring 114 illustrated in FIG. 6, and thus the axial size of the mouth 10 can be decreased by the size of the bead ring 114. Further, in this embodiment, the bead ring 114 is not needed, and thus the axial size of the mouth 10 can be decreased, thus a resin amount to be used can be decreased and as a result the weight of the mouth 10 and material cost can be reduced.

Further, in the container 1 according to this embodiment, in the process of engaging the gripper 3 with the gripper engaging groove 11, the upper side inclination 11c or the lower side inclination 11d slides to the first inclination 3a or the second inclination 3b of the gripper 3 and serves as a guide surface that guides the gripper 3 to an appropriate axial position. Since the gripper 3 can be smoothly inserted into the gripper engaging groove 11, the neck ring 13 and the external thread 12 respectively provided above and below the gripper engaging groove 11 can be disposed near the gripper engaging groove 11. In other words, a distance between the external thread 12 and the neck ring 13 located above and below the gripper engaging groove 11 can be decreased. Thus the axial size of the mouth 10 can be further reduced. It is to be noted that, as illustrated in FIG. 2, when the lower side inclination 11d of the gripper engaging groove 11 is formed continuous to the upper surface 13a of the neck ring 13, the axial size of the mouth 10 can be further reduced.

As described above, according to this embodiment, increase in size of the mouth 10 is prevented, and stability when the mouth 10 is transferred by being gripped by the gripper 3 can be improved.

It is to be noted that, in this embodiment, in the longitudinal sectional view passing through the axis O of the mouth 10, an inclination angle θ1 of the upper side inclination 11c and an inclination angle θ2 of the lower side inclination 11d with respect to a plane P perpendicular to the axis O of the mouth 10 may preferably be in a range of not less than 15° and not more than 60°, which allows for an effective increase in stability when the gripper 3 grips the mouth 10 by being engaged with the gripper engaging groove 11. It is to be noted that the inclination angle θ1 of the upper side inclination 11c and the inclination angle θ2 of the lower side inclination 11d may be equal or different to each other.

Figure 3:
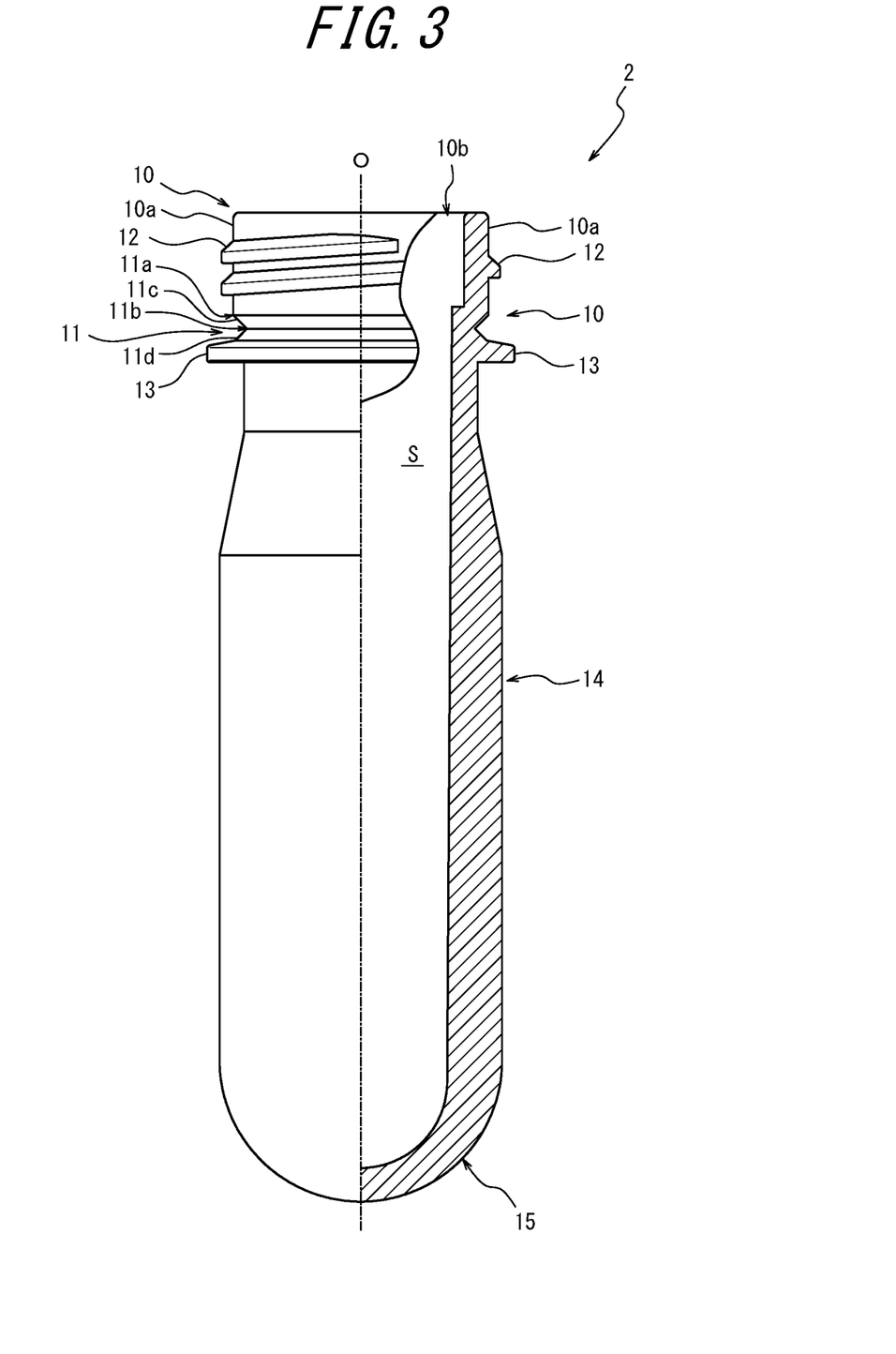
FIG. 3 is an elevation view illustrating, in cross section, a part of a synthetic resin preform according to an embodiment of this disclosure.

FIG. 3 illustrates a synthetic resin preform 2 according to an embodiment of this disclosure. The preform 2 is molded into a container of a predetermined shape (e.g. the above described container 1) by blow molding. Further, the pressurized fluid used during blow molding is not specifically limited, and it may be a gas such as air or a liquid. In this embodiment, the preform 2 is formed by injection molding of synthetic resin material such as polyethylene (PE), polypropylene (PP) and polyethylene terephthalate (PET), and is molded into a container that contains contents by blow molding. It is to be noted that, since the mouth 10 of the preform 2 is not stretched and deformed during blow molding, the mouth of the container after molding maintains the shape of the mouth 10 of the preform 2.

It is to be noted that the preform 2 is not limited to those formed by injection molding of a synthetic resin material, and it may be those formed by compression molding or extrusion blow molding of a synthetic resin material.

The preform 2 has the mouth 10 with the same shape as that of above described container. Further, the preform 2 has a cylindrical trunk forming portion 14 integrally continuous to the mouth 10 and a hemispherical bottom forming portion 15 integrally continuous to the lower end of the trunk forming portion 14 (lower side end in FIG. 3). The hemispherical bottom forming portion 15 closes the lower end of the trunk forming portion 14. In this embodiment, the mouth 10, the trunk forming portion 14 and the bottom forming portion 15 are coaxially disposed to each other and the preform 2 has an approximately test tube shape as a whole. However, the shapes of the trunk forming portion 14 and the bottom forming portion 15 may be changed appropriately.

According to the preform 2 of this embodiment, as with the above described container 1, increase in size of the mouth 10 can be suppressed, and further stability when the mouth 10 is transferred by being gripped by the gripper 3 can be improved.

Figure 4:
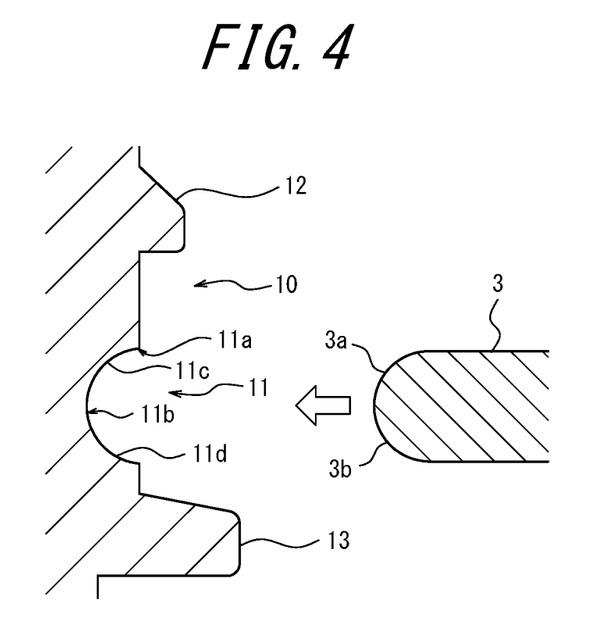
FIG. 4 is a diagram illustrating a variation of a gripper engaging groove according to the present disclosure.
Figure 5:
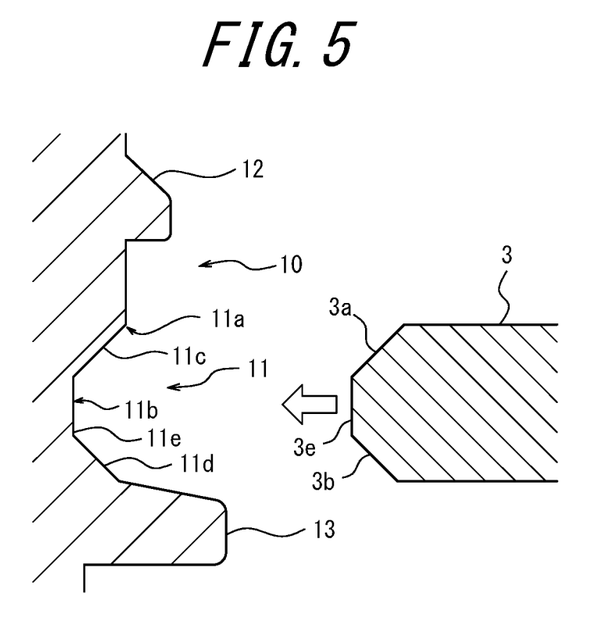
FIG. 5 is a diagram illustrating a variation of the gripper engaging groove according to the present disclosure.

FIGS. 4 and 5 illustrate a variation of the mouth 10 of the container 1 or the preform 2. It is to be noted that the parts that have the same basic functions as the embodiment described above are assigned with the same reference signs and the description thereof is omitted.

As illustrated in FIG. 4, the gripper engaging groove 11 may be a recess that forms a semicircular outline in the view of longitudinal section passing through the axis O of the mouth 10. In this case, the shape of the gripper 3 is a protrusion forming a semicircular outline in the longitudinal sectional view. The upper side inclination 11c and the lower side inclination 11d of the gripper engaging groove 11 are respectively formed of recessed curved surfaces, and the first inclination 3a and the second inclination 3b of the gripper 3 are protruded curved surfaces disposed facing the upper side inclination 11c and the lower side inclination 11d, respectively.

Further, as illustrated in FIG. 5, the gripper engaging groove 11 may be a recess that forms a trapezoidal outline in the longitudinal sectional view. In this case, the gripper 3 is formed into a protrusion that forms a trapezoidal outline in the longitudinal sectional view. Between the upper side inclination 11c and the lower side inclination 11d of the gripper engaging groove 11 is formed with a bottom 11e parallel to the axis O. Corresponding thereto the gripper 3 has a flat surface 3e between the first inclination 3a and the second inclination 3b.

The present disclosure is not limited to the above described embodiments, and may be modified in various manners within the scope without departing from its spirit. For example, the shapes of the upper side inclination 11c and the lower side inclination 11d of the gripper engaging groove 11 may not completely correspond to the shapes of the first inclination 3a and the second inclination 3b of the gripper 3. For example, a recess and the like may be provided in the upper side inclination 11c or the lower side inclination 11d so as not to disturb engagement between the gripper engaging groove 11 and the gripper 3, for example.

REFERENCE SIGNS LIST

1 Synthetic resin container
2 Preform
3 Gripper
3a First inclination
3b Second inclination
3e Flat surface
10 Mouth
10a Outer circumferential surface
11 Gripper engaging groove
11a Opening
11b Bottom of the groove
11c Upper side inclination
11d Lower side inclination
11e Bottom
12 External thread (cap engaging portion)
13 Neck ring (mold engaging portion)
14 Trunk forming portion
15 Bottom forming portion
O Axis
S Accommodation space
θ1 Inclination angle of upper side inclination
θ2 Inclination angle of lower side inclination

The invention claimed is:

1. A synthetic resin container configured to engage with a gripper of a transfer apparatus, the container comprising a tubular mouth and forming an accommodation space of contents,
    wherein an outer circumferential surface of the mouth is provided with a gripper engaging groove to be engaged with the gripper of the transfer apparatus, the gripper engaging groove being formed such that a width of the groove is decreased from an opening opened in the outer circumferential surface of the mouth toward a bottom of the groove,
    the gripper engaging groove corresponds to a shape of the gripper and has an upper side inclination and a lower side inclination respectively obliquely extending with respect to a plane perpendicular to an axis of the mouth,
    the upper side inclination and the lower side inclination of the gripper engaging groove extend in a linear state, and
    an outline of the gripper engaging groove is V-shaped in a longitudinal sectional view passing through the axis of the mouth.

2. The synthetic resin container according to claim 1, wherein the outer circumferential surface of the mouth is provided with a cap engaging portion located above the gripper engaging groove and a mold engaging portion located below the gripper engaging groove.

3. The synthetic resin container according to claim 1, wherein, with the gripper engaging groove engaged with the gripper, the upper side inclination and the lower side inclination are disposed, respectively, facing a first inclination and a second inclination provided on the gripper.

4. The synthetic resin container according to claim 1, wherein, in a longitudinal sectional view passing through the axis of the mouth, inclination angles of the upper side inclination and the lower side inclination with respect to the plane perpendicular to the axis of the mouth are respectively in a range of not less than 15° and not more than 60°.

5. A synthetic resin container configured to engage with a gripper of a transfer apparatus, the container comprising a tubular mouth and forming an accommodation space of contents,
    wherein an outer circumferential surface of the mouth is provided with a gripper engaging groove to be engaged with the gripper, the gripper engaging groove being formed such that a width of the groove is decreased from an opening opened in the outer circumferential surface of the mouth toward a bottom of the groove,
    the gripper engaging groove corresponds to a shape of the gripper and has an upper side inclination and a lower side inclination respectively obliquely extending with respect to a plane perpendicular to an axis of the mouth,
    the upper side inclination and the lower side inclination of the gripper engaging groove are respectively formed of recessed curved surfaces in a longitudinal sectional view passing through the axis of the mouth, and
    an outline of the gripper engaging groove is formed semicircular in the longitudinal sectional view.

6. The synthetic resin container according to claim 5, wherein the outer circumferential surface of the mouth is provided with a cap engaging portion located above the gripper engaging groove and a mold engaging portion located below the gripper engaging groove.

7. The synthetic resin container according to claim 5, wherein, with the gripper engaging groove engaged with the gripper, the upper side inclination and the lower side inclination are disposed, respectively, facing a first inclination and a second inclination provided on the gripper.

8. The synthetic resin container according to claim 5, wherein, in a longitudinal sectional view passing through the axis of the mouth, inclination angles of the upper side inclination and the lower side inclination with respect to the plane perpendicular to the axis of the mouth are respectively in a range of not less than 15° and not more than 60°.

\* \* \* \* \*